(12) United States Patent
Lauder

(10) Patent No.: US 10,318,018 B2
(45) Date of Patent: *Jun. 11, 2019

(54) SYSTEMS, METHODS, AND COMPUTER-READABLE MEDIA FOR GENERATING COMPUTER-MEDIATED REALITY DISPLAY DATA

(71) Applicant: Sony Interactive Entertainment America LLC, San Mateo, CA (US)

(72) Inventor: Gary Lauder, Los Altos, CA (US)

(73) Assignee: Sony Interactive Entertainment America LLC, San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/696,113

(22) Filed: Sep. 5, 2017

(65) Prior Publication Data

US 2018/0011552 A1 Jan. 11, 2018

Related U.S. Application Data

(62) Division of application No. 14/323,247, filed on Jul. 3, 2014, now Pat. No. 9,753,553.

(Continued)

(51) Int. Cl.
*G06F 3/0346* (2013.01)
*G06F 1/16* (2006.01)
(Continued)

(52) U.S. Cl.
CPC .......... *G06F 3/0346* (2013.01); *G06F 1/1694* (2013.01); *G06F 3/012* (2013.01);
(Continued)

(58) Field of Classification Search
None
See application file for complete search history.

(56) References Cited

U.S. PATENT DOCUMENTS 7,640,106 B1* 12/2009 Stokar ............... G01C 21/16
342/147
9,230,501 B1* 1/2016 Starner ............... G09G 5/00
(Continued)

*Primary Examiner* — David H Chu
(74) *Attorney, Agent, or Firm* — Penilla IP, APC

(57) ABSTRACT

Systems, methods, and computer-readable media are provided for generating computer-mediated reality display data based on user instantaneous motion data. A system includes at least one sensor, a mediated reality data source, and a mediated reality display generator that generates displayable mediated reality scene data based on (a) current reality data of the system from the at least one sensor; (b) mediated reality data from the mediated reality data source; and (c) instantaneous motion data of the system from the at least one sensor. In one example the mediated reality display generator generates the displayable mediated reality scene data by generating displayable mediated reality frame data based on the current reality data and the mediated reality data. The operations further include selecting a portion of the displayable mediated reality frame data as the displayable mediated reality scene data based on the instantaneous motion data. The portion that is selected is offset from a center of the displayable mediated reality frame data and is less than a frame size of the displayable mediated reality frame data and the offset is selected based on said instantaneous motion.

8 Claims, 6 Drawing Sheets

Related U.S. Application Data

(60) Provisional application No. 61/842,864, filed on Jul. 3, 2013.

(51) Int. Cl.
  *G06F 3/01* (2006.01)
  *G06F 3/038* (2013.01)
  *G09G 5/00* (2006.01)

(52) U.S. Cl.
  CPC .............. *G06F 3/038* (2013.01); *G09G 5/00* (2013.01); *G09G 2340/14* (2013.01); *G09G 2354/00* (2013.01)

(56) References Cited

U.S. PATENT DOCUMENTS

| | | | | |
|---|---|---|---|---|
| 2004/0006424 | A1* | 1/2004 | Joyce | G01S 5/0027 701/408 |
| 2007/0146372 | A1* | 6/2007 | Gee | G06T 13/00 345/474 |
| 2008/0218436 | A1* | 9/2008 | Lipscomb | G02B 27/017 345/8 |
| 2009/0010489 | A1* | 1/2009 | Appel | G06T 7/0004 382/100 |
| 2010/0026714 | A1* | 2/2010 | Utagawa | G02B 27/017 345/633 |
| 2013/0072308 | A1* | 3/2013 | Peck | A63F 13/65 463/42 |
| 2013/0114849 | A1* | 5/2013 | Pengelly | G06F 17/289 382/103 |
| 2014/0067164 | A1* | 3/2014 | Papadopoulos | B64G 1/002 701/3 |
| 2014/0085490 | A1* | 3/2014 | Arai | H04N 5/23222 348/207.11 |
| 2014/0104316 | A1* | 4/2014 | Sharma | G06F 1/1626 345/633 |
| 2014/0347475 | A1* | 11/2014 | Divakaran | G06K 9/00771 348/135 |
| 2015/0145889 | A1* | 5/2015 | Hanai | H04N 5/2621 345/633 |
| 2015/0206349 | A1* | 7/2015 | Rosenthal | H04N 21/41407 345/633 |

* cited by examiner

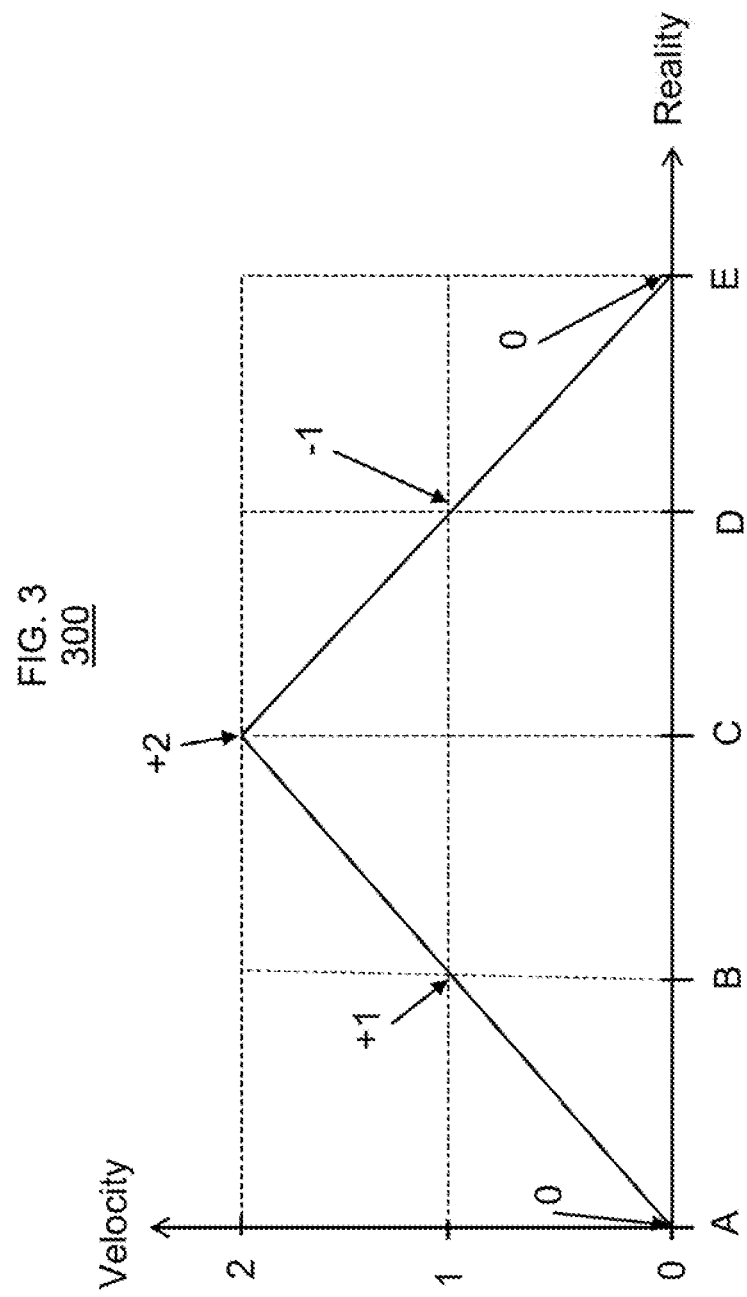

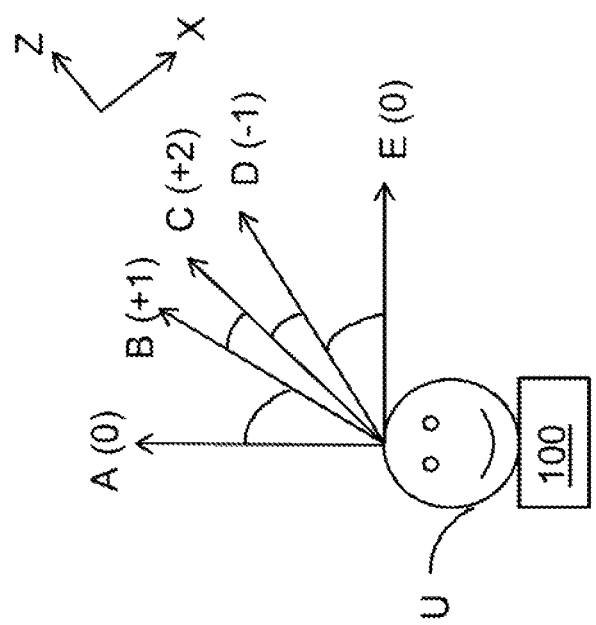

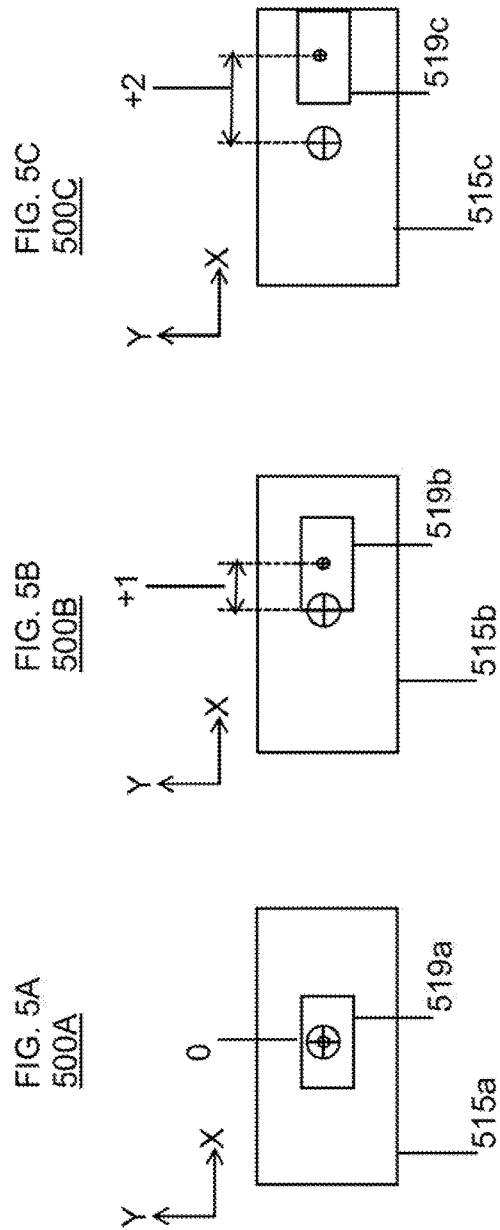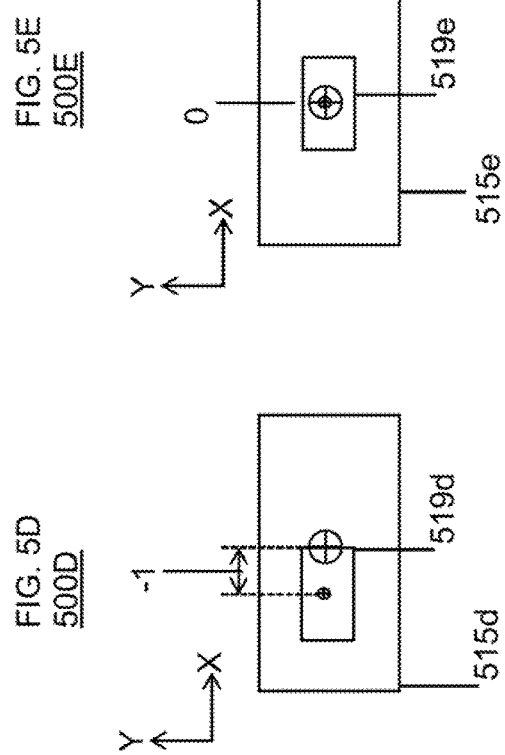

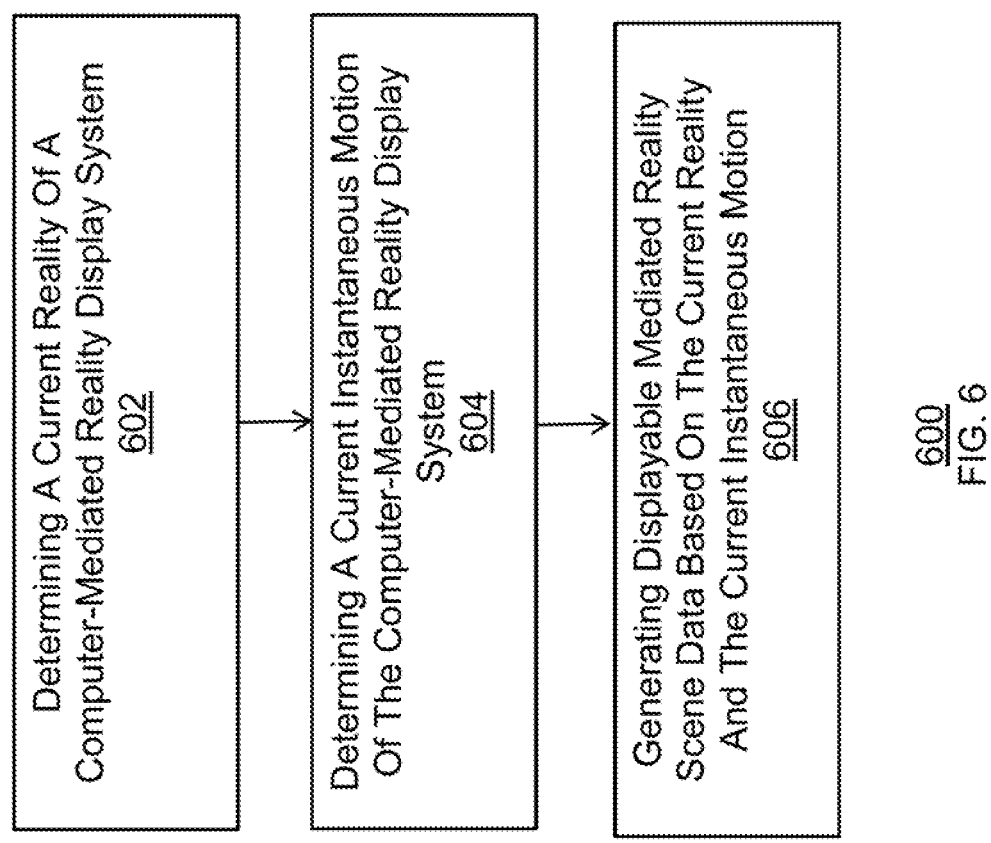

SYSTEMS, METHODS, AND COMPUTER-READABLE MEDIA FOR GENERATING COMPUTER-MEDIATED REALITY DISPLAY DATA

CLAIM OF PRIORITY

This application is a Divisional of U.S. application Ser. No. 14/323,247, filed on Jul. 3, 2014, (U.S. Pat. No. 9,753,553, Issued on Sep. 5, 2017), entitled "Systems, Methods, and Computer-Readable Media for Generating Computer-Mediated Reality Display Data", which further claims the benefit of prior filed U.S. Provisional Patent Application No. 61/842,864, filed Jul. 3, 2013, which are hereby incorporated by reference.

TECHNICAL FIELD

This can relate to systems, methods, and computer-readable media for generating computer-mediated reality display data and, more particularly, to systems, methods, and computer-readable media for generating computer-mediated reality display data based on user instantaneous motion data.

BACKGROUND

Conventional computer-mediated reality systems (e.g., virtual reality systems and augmented reality systems) have been developed in which a user is provided with a head mounted display. When the user moves his or her head around, the head mounted display changes the images being displayed to the user based on the new position (e.g., reality) of the head mounted display. Conventional head mounted display systems have a tendency to induce dizziness or excessive eye fatigue on the user. These negative effects can become even more pronounced if the user rapidly moves his or her head. These negative effects can be caused by the head mounted display system's inability to present images to the user in a manner that is commensurate with the user's head movements. That is, when the user's head movements and images being displayed in response thereto are out of sync, the user may not be presented with the best virtual reality or augmented reality experience. Accordingly, improved display data generation for computer-mediated reality systems and methods are needed.

SUMMARY

Systems, methods, and computer-readable media for generating computer-mediated reality display data are provided.

In some embodiments, there is provided a computer-mediated reality system that may include at least one sensor, a mediated reality data source, and a mediated reality display generator. The mediated reality display generator may generate displayable mediated reality scene data based on current reality data of the system from the at least one sensor, mediated reality data from the mediated reality data source, and instantaneous motion data of the system from the at least one sensor. For example, the current reality data of the system may be provided to the mediated reality display generator from a first sensor of the at least one sensor, and the instantaneous motion data of the system may be provided to the mediated reality display generator from a second sensor of the at least one sensor. The mediated reality display generator may be configured to generate displayable mediated reality frame data based on the current reality data and the mediated reality data, and the mediated reality display generator may be configured to generate the displayable mediated reality scene data by selecting a portion of the displayable mediated reality frame data based on the instantaneous motion data. In some embodiments, a center of the selected portion may be offset from a center of the displayable mediated reality frame data based on the instantaneous motion data. The current reality data of the system may be indicative of the current location of the system, where such current reality data may be provided to the mediated reality display generator from a global positioning system sensor, and/or where the mediated reality data of the system may be indicative of information that is both related to the current location of the system and useful to a user of the system. The current reality data of the system may be indicative of the current orientation of the system, where such current reality data may be provided to the mediated reality display generator from at least one of a compass sensor and a gyroscope sensor. The instantaneous motion data of the system may be provided to the mediated reality display generator from at least one accelerometer sensor.

In other embodiments, there is provided a method that may include determining a current reality of a computer-mediated reality display system, determining a current instantaneous motion of the computer-mediated reality display system, and generating displayable mediated reality scene data based on the determined current reality and the determined current instantaneous motion. In some embodiments, such a method may also include generating displayable mediated reality frame data based on the determined current reality, and selecting a portion of the displayable mediated reality frame data as the displayable mediated reality scene data based on the determined current instantaneous motion. A center of the selected portion may be offset from a center of the displayable mediated reality frame data based on the determined current instantaneous motion. In some other embodiments, such a method may include identifying displayable mediated reality frame data based on the determined current reality and selecting a field of view portion of the identified displayable mediated reality frame data as the displayable mediated reality scene data, where the position of the selected field of view portion of the identified displayable mediated reality frame data with respect to the entirety of the identified displayable mediated reality frame data may be a first position that is based on the determined current instantaneous motion. Such a method may be repeated at a later second time, in which the second position of the selected second field of view portion of the identified second displayable mediated reality frame data with respect to the entirety of the identified second displayable mediated reality frame data may be different than the first position at the earlier first time. In such embodiments, the first position may be different than the second position with respect to two axes.

In yet other embodiments, there is provided a non-transitory computer-readable medium that may include computer-readable instructions recorded thereon for displaying mediated reality scene data, determining a current reality of a computer-mediated reality display system, determining a current instantaneous motion of the computer-mediated reality display system, and virtually altering the frame rate of the displayed mediated reality scene data by moving the field of view of the mediated reality scene data with respect to the determined current reality of the system based on the determined current instantaneous motion. The determined current instantaneous motion may include a derivative of the current acceleration of the computer-mediated reality display system. In such embodiments, the moving may include moving the field of view with respect to the determined current reality of the system in a first particular direction when the current acceleration is positive in the first particular direction, and/or moving the field of view with respect to the determined current reality of the system in a second particular direction opposite to the first particular direction when the current acceleration is negative in the first particular direction.

In still yet other embodiments, there is provided a machine-readable storage medium that may provide instructions that, when executed by a processor, may cause the processor to perform operations. The operations may include determining a current reality of a computer-mediated reality display system, determining a current instantaneous motion of the computer-mediated reality display system, and generating displayable mediated reality scene data based on the determined current reality and the determined current instantaneous motion.

This Summary is provided merely to summarize some example embodiments, so as to provide a basic understanding of some aspects of the subject matter described in this document. Accordingly, it will be appreciated that the features described in this Summary are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The above and other aspects of the disclosure, its nature, and various features will become more apparent upon consideration of the following detailed description, taken in conjunction with the accompanying drawings, in which like reference characters refer to like parts throughout, and in which:

FIG. 3 is an exemplary graph plotting system velocity versus system reality, in accordance with various embodiments;

FIG. 4 is an exemplary diagram illustrating a system's movement in reality based on the graph of FIG. 3, in accordance with various embodiments;

FIGS. 5A-5E are exemplary computer-mediated reality display frame data and associated screen data based on the graph of FIG. 3, in accordance with various embodiments; and FIG. 6 is a flowchart of an illustrative process for generating computer-mediated reality display data, in accordance with various embodiments.

DETAILED DESCRIPTION

Figure 1:
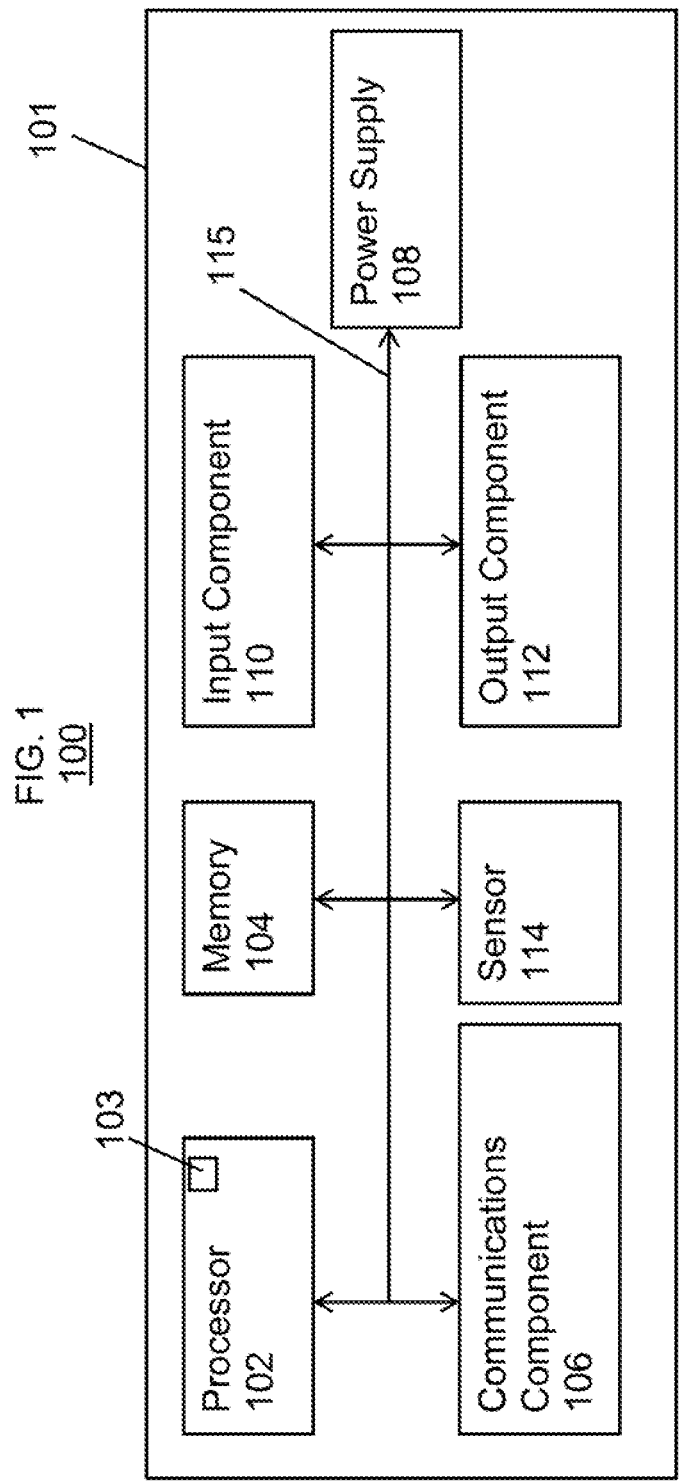
FIG. 1 is a schematic view of an illustrative system for generating computer-mediated reality display data, in accordance with various embodiments.

Systems, methods, and computer-readable media for generating computer-mediated reality display data are provided and described with reference to FIGS. 1-6.

A computer-mediated reality system may include a mediated reality frame generator (e.g., a graphics processing unit) that may generate displayable frame data based on a current reality of the system and mediated reality data associated with that current reality. For example, the current reality of the system may be determined using any suitable sensor or combination of sensors and may be indicative of the current location of the system (e.g., via a GPS sensor), the current orientation of the system (e.g., via a compass sensor), and/or any other suitable information that may define the current relationship of the system with respect to its environment at a particular moment in time, while the mediated reality data may be any suitable data not naturally present in the system's environment but that may be associated with the system's environment in any suitable way (e.g., augmented or virtual reality data or video game data). The system may also include a mediated reality scene generator (e.g., a field of view ("FOV") processing unit) that may generate displayable scene data based on the generated displayable frame data and a current instantaneous motion of the system. For example, the current instantaneous motion of the system may be determined using any suitable sensor or combination of sensors and may be indicative of the instantaneous velocity and/or the instantaneous acceleration of the system in one or more directions (e.g., via one or more accelerometer sensors) at a particular moment in time (e.g., at the same moment in time as the current reality of the system was determined for the generated displayable frame data). The mediated reality scene generator may generate the displayable scene data by selecting a particular portion of the generated displayable frame data as the displayable scene data based on the current instantaneous motion of the system.

For example, if the current instantaneous motion is indicative of the system accelerating in a first direction along a first axis, the center of the selected particular portion of the generated displayable frame data may be offset from the center of the entirety of the generated displayable frame data in that first direction along that first axis. Alternatively or additionally, if the current instantaneous motion is indicative of the system decelerating in that first direction along that first axis, the center of the selected particular portion of the generated displayable frame data may be offset from the center of the entirety of the generated displayable frame data in a second direction opposite that first direction along that first axis. Therefore, such a system may virtually alter the frame rate of mediated reality data provided to a user of the system (e.g., as displayable scene data via a display of the system) by moving a field of view of the displayable scene data with respect to an orientation point (e.g., the center) of the displayable frame data based on a current instantaneous motion of the system. This may reduce the negative effects (e.g., dizziness, eye fatigue, etc.) that may often be associated with a system's presentation of mediated reality data that is constantly updated based on the current reality of the system when the system is being moved rapidly.

FIG. 1 is a schematic view of an illustrative system 100 for generating computer-mediated reality display data in accordance with some embodiments of the invention. For example, in some embodiments, as shown in FIG. 1, system 100 may include, but is not limited to, a music player, video player, still image player, game player, other media player and/or recorder, cellular telephone, other wireless communication device, personal digital assistant, remote control, pager, computer (e.g., a desktop, laptop, tablet, server, etc.), monitor, television, stereo equipment, set up box, set-top box, or any combination thereof that may be capable of generating computer-mediated reality data. System 100 may be any portable, mobile, hand-held, or miniature electronic device that may be configured to generate computer-mediated reality data wherever a user travels. Some miniature electronic devices may have a form factor that is smaller than that of hand-held electronic devices. Illustrative miniature electronic devices can be integrated into various objects that may include, but are not limited to, watches, headsets, virtual reality devices, glasses, other wearable electronics, accessories for sporting equipment, accessories for fitness equipment, or any combination thereof. System 100 may include a single integral electronic device or multiple electronic components that may be used together to form an electronic system.

As shown in FIG. 1, for example, system 100 may include a processor 102, memory 104, communications component 106, power supply 108, input component 110, output component 112, and sensor 114. System 100 may also include a bus 115 that may provide one or more wired or wireless communications links or paths for transferring data and/or power to, from, or between various other components of system 100. In some embodiments, one or more components of system 100 may be combined or omitted. Moreover, system 100 may include other components not combined or included in FIG. 1 and/or several instances of the components shown in FIG. 1. For the sake of simplicity, only one of each of the components of system 100 is shown in FIG. 1.

Memory 104 of system 100 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may store media data (e.g., audio, image, and/or video files), software (e.g., for implementing functions on system 100), firmware, computer-mediated reality data information, preference information (e.g., media playback preferences), wireless connection information (e.g., information that may enable system 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Communications component 106 of system 100 may be provided to allow system 100 to communicate with one or more other electronic systems, electronic devices, or servers using any suitable wired or wireless communications protocol. For example, first communications component 106 may support Wi-Fi (e.g., an 802.11 protocol), ZigBee (e.g., an 802.15.4 protocol), WiDi™, Ethernet, Bluetooth™, Bluetooth™ Low Energy ("BLE"), high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), Stream Control Transmission Protocol ("SCTP"), Dynamic Host Configuration Protocol ("DHCP"), hypertext transfer protocol ("HTTP"), BitTorrent™, file transfer protocol ("FTP"), real-time transport protocol ("RTP"), real-time streaming protocol ("RTSP"), real-time control protocol ("RTCP"), Remote Audio Output Protocol ("RAOP"), Real Data Transport Protocol™ ("RDTP"), User Datagram Protocol ("UDP"), secure shell protocol ("SSH"), wireless distribution system ("WDS") bridging, any communications protocol that may be used by wireless and cellular telephones and personal e-mail devices (e.g., Global System for Mobile Communications ("GSM"), GSM plus Enhanced Data rates for GSM Evolution ("EDGE"), Code Division Multiple Access ("CDMA"), Orthogonal Frequency-Division Multiple Access ("OFDMA"), high speed packet access ("HSPA"), multi-band, etc.), any communications protocol that may be used by a low power Wireless Personal Area Network ("6LoWPAN") module, any other communications protocol, or any combination thereof. Communications component 106 may be configured to enable system 100 to be electrically coupled to one or more other electronic systems, electronic devices, or servers and to communicate with that other entity, either wirelessly or via a wired connection.

Power supply 108 of system 100 may provide power to one or more of the components of system 100. In some embodiments, power supply 108 can be coupled to a power grid (e.g., when system 100 is not a portable device, such as a desktop computer). In some embodiments, power supply 108 can include one or more batteries for providing power (e.g., when system 100 is a portable device, such as a wearable computer, such as a head-mounted display-based computing device, such as Google Glass™). As another example, power supply 108 can be configured to generate power from a natural source (e.g., solar power using solar cells).

One or more input components 110 of system 100 may be provided to permit a user to interact or interface with system 100. For example, input component 110 can take a variety of forms, including, but not limited to, a touch pad, dial, click wheel, scroll wheel, touch screen, one or more buttons (e.g., a keyboard), mouse, joy stick, track ball, microphone, camera, motion sensor, proximity sensor, light detector, and combinations thereof. Each input component 110 can be configured to provide one or more dedicated control functions for making selections or issuing commands associated with operating system 100.

System 100 may also include one or more output components 112 that may present information (e.g., visual, audible, and/or tactile information) to a user of system 100. Output component 112 of system 100 may take various forms, including, but not limited to, audio speakers, headphones, audio lines-out, visual displays, video lines-out, antennas, infrared ports, rumblers, vibrators, or combinations thereof.

For example, as shown in FIG. 1 and described in more detail hereinbelow, system 100 may include a display output component 112 as an output component. Such a display output component 112 may include any suitable type of output interface for presenting visual data (e.g., computer-mediated reality display data) to a user. In some embodiments, display output component 112 may include any suitable type of visual display, including, but not limited to, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, such a display output component 112 can include a movable display or a projecting system for providing a display of content on a surface remote from system 100, such as, for example, a video projector, a head-up display, or a three-dimensional (e.g., holographic) display. As another example, such a display output component 112 may include a digital or mechanical viewfinder, such as a viewfinder of the type found in compact digital cameras, reflex cameras, or any other suitable still or video camera. Display output component 112 can be operative to output the playback of media content and/or computer-mediated reality display data that may be under the direction of processor 102 to an environment external to system 100 for receipt by a user.

It should be noted that one or more input components 110 and one or more output components 112 may sometimes be referred to collectively herein as an input/output ("I/O") component or I/O interface (e.g., input component 110 and display 112 as an I/O component or I/O interface). For example, input component 110 and display output component 112 may sometimes be a single I/O component, such as a touch screen assembly, that may receive input information through a user's touch of a display screen assembly and that may also provide visual information to a user via that same display screen assembly.

Sensor 114 of system 100 may include any suitable sensor that may be operative to determine the location, orientation, position, instantaneous motion, and/or any other suitable characteristic of system 100 within its environment and/or any suitable characteristic of the environment itself. For example, sensor 114 may be one or more of a compass, accelerometer, gyroscope, global positioning system ("GPS"), microphone, camera, motion sensor, proximity sensor, light detector, any combination thereof, and/or any other suitable sensor.

Processor 102 of system 100 may include any processing circuitry that may be operative to control the operations and/or performance of one or more components of system 100. For example, processor 102 may receive input signals from input component 110 and/or drive output signals through output component 112. In some embodiments, as shown in FIG. 1, processor 102 may be used to run one or more applications, such as an application 103. Application 103 may include, but is not limited to, one or more operating system applications, firmware applications, computer-mediated reality data applications, media playback applications, media editing applications, or any other suitable applications. For example, processor 102 may load application 103 as a computer-mediated reality interface program to determine how instructions or data received via an input component 110 or other component of device 100 (e.g., one or more sensors 114) may manipulate the way in which information is stored and/or provided to the user via an output component 112 (e.g., via a display output component 112). Application 103 may be accessed by processor 102 from any suitable source, such as from memory 104 (e.g., via bus 115), from any other suitable remote system or electronic device (e.g., via communications component 106), or from any other suitable source.

System 100 may also be provided with a housing 101 that may at least partially enclose one or more of the components of system 100 for protection from debris and other degrading forces external to system 100. In some embodiments, one or more of the components of system 100 may be provided within its own housing (e.g., input component 110 may be a joystick within its own housing that may wirelessly or through a wire communicate with processor 102 and output component 112, which may be provided within their own housing). System 100 may be configured in various ways and may include various combinations of various components while still generating computer-mediated reality display data based on user instantaneous motion data.

Figure 2:
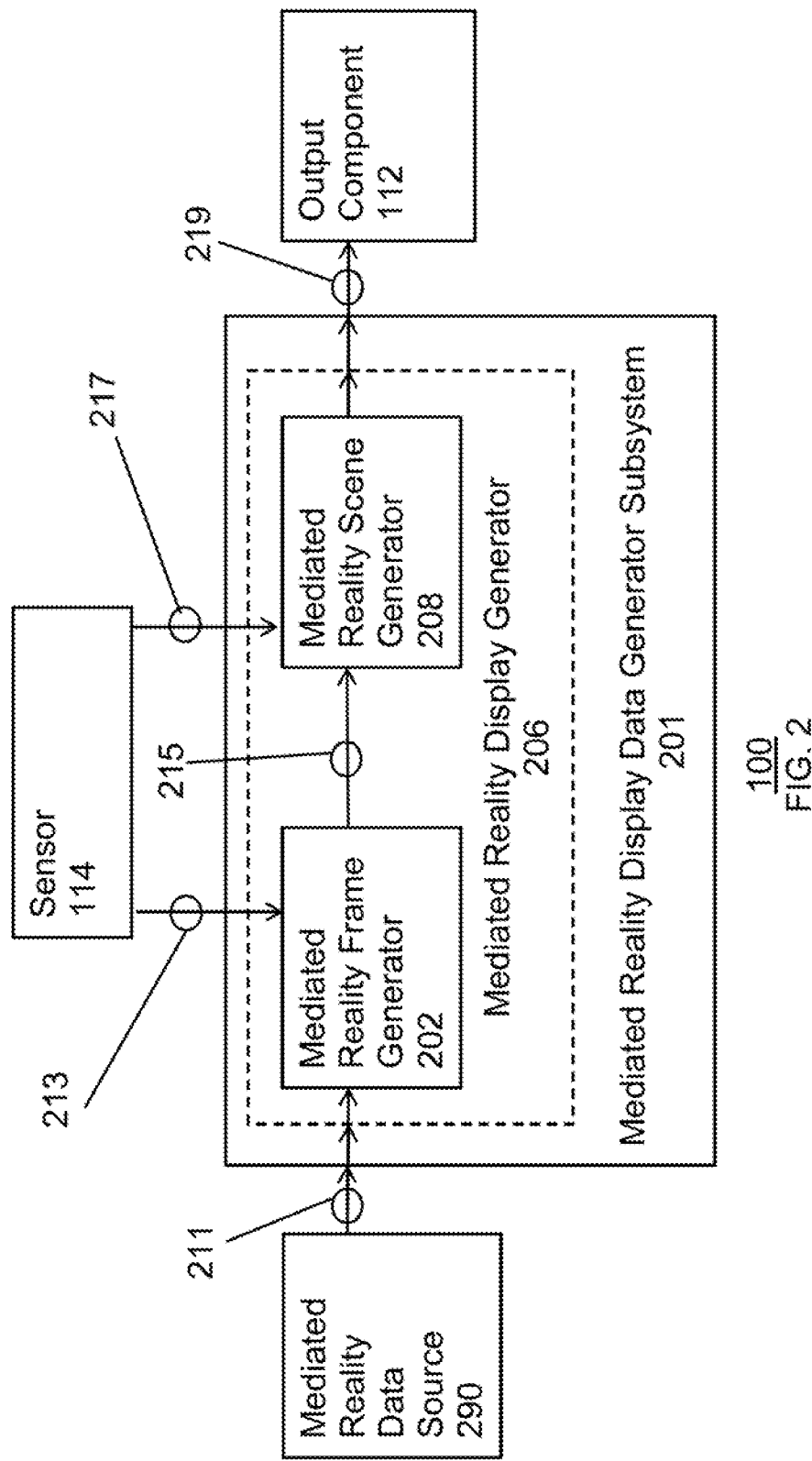
FIG. 2 is a schematic view of illustrative portions of the system of FIG. 1, in accordance with various embodiments.

FIG. 2 shows a schematic view of a computer-mediated reality display data generator subsystem 201 of system 100 that may be provided to at least partially generate computer-mediated reality display data based on user instantaneous motion data. For example, in some embodiments, mediated reality display data generator subsystem 201 may include a mediated reality frame generator 202 and a mediated reality scene generator 208. Frame generator 202 may be configured to receive mediated reality data 211 from a mediated reality data source 290 and/or frame definition data 213 from at least one sensor 114, and then frame generator 202 may be configured to generate displayable frame data 215 based on received mediated reality data 211 and received frame definition data 213. For example, at least one sensor 114 may be configured to generate frame definition data 213, which may be indicative of the current location of system 100, position of system 100, orientation of system 100, and/or any other suitable data that may in one or more ways define system 100's current relationship with the environment (e.g., a user's current reality or relationship with the environment when system 100 is held, worn, or otherwise used by the user). For example, system 100 may be a wearable computer with a head-mounted display (e.g., Google Glass™), and frame definition data 213 may be data indicative of the current location (e.g., GPS sensor data), the current position and/or current orientation (e.g., compass sensor data and/or gyroscope sensor data), and/or any other suitable type of relationship data that may be indicative of the current relationship of the head-mounted display of system 100 with respect to its environment. When a user wearing such a head-mounted display moves to a new location and/or alters the orientation of the head-mounted display, frame definition data 213 may be updated to appropriately describe the current reality or existence of the head-mounted display within its surrounding environment (e.g., the current reality of system 100 and its user).

Frame generator 202 may receive such frame definition data 213 as well as any accessible mediated reality data 211 from mediated reality data source 290 in order to define and/or generate displayable frame data 215 for that current existence/reality of system 100. Data source 290 may be any suitable data source accessible to subsystem 201 of system 100 that may provide suitable mediated reality data 211 that may be useful to a user of system 100 for its current reality. Such mediated reality data 211 may include any suitable data, such as visual data, that may be overlaid on a user's current reality to add value to the user's experience (e.g., street name mediated reality data may be overlaid on a user's reality view of an intersection with no street signs). Additionally or alternatively, such mediated reality data 211 may include video game data, virtual reality data, and/or augmented reality experience data that may be based on the current location and/or position and/or orientation of the system 100, which may be determined by data 213. Data source 290 may be any suitable data source accessible to subsystem 201, such as memory 104 or a remote server accessible to system 100 via communications component 106. Based on the user's current reality (e.g., as defined by frame definition data 213) and based on available mediated reality data 211 (e.g., as provided by data source 290), frame generator 202 may generate appropriate displayable frame data 215 that may be provided to a user (e.g., via display output component 112) for enhancing the user's experience of his or her current reality. Frame generator 202 may be a graphics processing unit ("GPU") or any other suitable component or combination of components and/or modules.

In addition to leveraging the user's current reality (e.g., current position, location, orientation, etc.) using frame definition data 213 to determine what mediated reality data may be provided to the user, subsystem 201 may also leverage the instantaneous motion information of the user at its current reality (e.g., the instantaneous velocity and/or the instantaneous acceleration of system 100 in one or more directions for the user's reality at a particular moment in time). For example, at least one sensor 114 may generate scene definition data 217 that may be indicative of one or more characteristics of instantaneous motion of system 100 (e.g., a head-mounted display), such as via one or more accelerometers or any other suitable type of sensor. By taking into account such instantaneous motion, subsystem 201 may adjust what mediated reality data is provided to the user in order to minimize irritation (e.g., headaches) that may be caused by updating mediated reality data to match the rate at which a user's reality is updated. For example, mediated reality scene generator 208 may receive displayable frame data 215 from frame generator 202 and scene definition data 217 from one or more sensors 114, and scene generator 208 may then generate displayable scene data 219 by utilizing a specific portion of the received displayable frame data 215, where that specific portion may be chosen by scene generator 208 based on the received scene definition data 217. Such generated displayable scene data 219 may then be provided by scene generator 208 to display output component 112 for use by a user of system 100. Scene generator 208 may be a field of view ("FOV") processing unit or any other suitable component or combination of components and/or modules.

For example, as shown in FIG. 3 by a graph 300 and in FIG. 4 by a diagram 400, a user U may wear or otherwise hold or manipulate system 100 such that its reality or existence (e.g., as may be determined by frame definition data 213) may change from a first reality A at a first time to another reality B at a second time after the first time to another reality C at a third time after the second time to another reality D at a fourth time after the third time and to yet another reality E at a fifth time after the fourth time. The change between any two consecutive ones of these realities may differ from each other. For example, the manner in which system 100 may be moved from reality A to reality B may be quite different than the manner in which system 100 may be moved from reality B to reality C. As just one example, as shown in FIG. 3 by graph 300, system 100 may start at reality A with no movement and then may reach a velocity of value 1 when it gets to reality B, and system 100 may achieve an even higher velocity of value 2 when it moves from reality B to reality C (e.g., when a user U quickly swivels its head to advance its focus along the X-axis). Then, system 100 may slow back down to the velocity of value 1 when it moves from reality C to reality D, and then system 100 may return to a state of rest when it moves from reality D to reality E. While frame definition data 213 may not be indicative of the manner in which system 100 moved when changing between realities (e.g., frame generator 202 may not take into account the type of movement utilized by system 100 to achieve a new reality when frame generator 202 generates displayable frame data 215), scene definition data 217 may be indicative of such movement (e.g., scene generator 208 may take into account the manner in which system 100 was moving when system 100 achieved a new reality such that scene generator 208 may generate displayable scene data 219 accordingly). As shown, the instantaneous motion (e.g., directional instantaneous velocity) of system 100 when at reality A may be 0, while it may be +1 at reality B, +2 at reality C, −1 at reality D, and 0 at reality E, and scene generator 208 may receive that instantaneous motion data (e.g., as scene definition data 217) for a particular reality and scene generator 208 may use that motion data to select a specific portion of displayable frame data 215 to be provided as displayable scene data 219 to the user when system 100 is at that respective reality.

For example, as shown in FIG. 5A, when system 100 is at reality A, generator subsystem 201 may process data 500A, which may include displayable frame data 515a (e.g., frame data 215 generated by generator 202 based on frame definition data 213 and mediated reality data 211 when system 100 is at reality A) and displayable scene data 519a (e.g., scene data 219 generated by generator 208 based on scene definition data 217 and frame data 215 (e.g., frame data 515a) when system 100 is at reality A). In some embodiments, scene data 519a may be a specific selected portion of frame data 515a. For example, the shape of scene data 519a may be the same as the shape of frame data 515a, but only a portion of the size (e.g., scene data may be a specific 20% portion of the generated frame data, but may have the same rectangular geometry). However, which specific portion of frame data 515a may be used as scene data 519a may be determined using scene definition data 217. For example, as shown in FIG. 5A, the center of frame data 515a and the center of scene data 519a may be the same (e.g., 0 displacement therebetween) due to scene definition data 217 at reality A being indicative of 0 instantaneous motion. However, as shown in FIG. 5B for data 500B when system 100 is at reality B, the center of scene data 519b may be offset from the center of frame data 515b by a +1 amount (e.g., along the X-axis) due to scene definition data 217 at reality B being indicative of +1 instantaneous motion. Following the same example, as shown in FIG. 5C for data 500C when system 100 is at reality C, the center of scene data 519c may be offset from the center of frame data 515c by a +2 amount (e.g., along the X-axis) due to scene definition data 217 at reality C being indicative of +2 instantaneous motion. Moreover, as shown in FIG. 5D for data 500D when system 100 is at reality D, the center of scene data 519d may be offset from the center of frame data 515d by a −1 amount (e.g., along the X-axis) due to scene definition data 217 at reality D being indicative of −1 instantaneous motion. Moreover, as shown in FIG. 5E for data 500E when system 100 is at reality E, the center of scene data 519e may be the same as the center of frame data 515e (e.g., 0 displacement therebetween) due to scene definition data 217 at reality E being indicative of 0 instantaneous motion.

Therefore, this may allow subsystem 201 to virtually alter the frame rate of mediated reality data provided to the user (e.g., as displayable scene data 219 via display output component 112) by moving displayable scene data 219 with respect to an orientation point (e.g., the center) of displayable frame data 215. For example, this may allow subsystem 201 to virtually speed up the frame rate of mediated reality data provided to the user by moving the center of displayable scene data 219 ahead of the center of displayable frame data 215 when the instantaneous motion for system 100 at the particular reality is positive (e.g., as shown in FIGS. 5B and 5C when system 100 has a positive instantaneous velocity or instantaneous acceleration in the +X-direction). Additionally or alternatively, this may allow subsystem 201 to virtually slow down the frame rate of mediated reality data provided to the user by moving the center of displayable scene data 219 behind the center of displayable frame data 215 when the instantaneous motion for system 100 at the particular reality is negative (e.g., as shown in FIG. 5D when system 100 has a negative instantaneous velocity or instantaneous acceleration in the +X-direction). For example, while FIG. 4 may show a user U rotating its head to advance a focus of system 100 along a positive direction of the X-axis in an X-Z plane from reality A to reality E (e.g., by changing orientational reality of system 100 worn on the head of user U, which may change the pointing direction of a camera of system 100), system 100 may provide each one of displayable scene data 519a-519e on display output component 112 in an X-Y plane, such that changes to the instantaneous motion of system 100 along the X-axis of FIG. 4 (e.g., as may be indicated by scene definition data 217) may affect how the selected portion of displayable frame data 515 as displayable scene data 519 may be positioned with respect to the entirety of displayable frame data 515 along the X-axis of FIGS. 5A-5E.

Although FIGS. 5A-5E may only show the center of scene data 219 (e.g., scene data 519a-519e) offset from the center of frame data 215 (e.g., frame data 515a-515e) only along one axis (e.g., along the X-axis), scene data 219 may be offset from frame data 215 along two or more axes, which may be due to instantaneous motion of system 100 as measured along two different axes (e.g., the instantaneous velocity of system 100 as measured along each of two axes by each of two accelerometers at a specific reality of system 100). Additionally or alternatively, although FIGS. 5A-5E may only show the center of scene data 219 (e.g., scene data 519a-519e) offset from the center of frame data 215 (e.g., frame data 515a-515e) based on scene definition data 217, any suitable reference point of scene data 219 may be offset from any suitable reference point of frame data 215 based on scene definition data 217. Moreover, in some embodiments, generators 202 and 208 may be combined (e.g., as mediated reality display generator 206 of FIG. 2), such that frame definition data 213, scene definition data 217, and mediated reality data 211 may be leveraged all at once to generate scene data 219 for delivery to a user via display output component 112. For example, rather than subsystem 201 configuring generator 202 to generate the entirety of frame data 215 (e.g., based on frame definition data 213 and reality data 211), and rather than configuring generator 208 to then select a particular portion of that entire frame data 215 to use as scene data 219 (e.g., based on scene definition data 217), generator 206 of subsystem 201 may be configured to only generate that particular portion of frame data 215 for use as scene data 219.

There may be various suitable ways to determine which portion of displayable frame data for a particular reality may be selected for use as displayable scene data for that particular reality (e.g., using instantaneous motion information for that particular reality). For example, the position of the selected scene data with respect to the frame data for a particular reality may be related (e.g., directly proportional) to the acceleration of the system along one or more axes at that particular reality, and may also be related to the position of the selected scene data with respect to the frame data for the previous reality occurring just before that particular reality. Alternatively or additionally, the position of the selected scene data with respect to the frame data for a particular reality may be at least partially based on a derivative of the acceleration of the system at the instance of time of that particular reality. The detected instantaneous motion of the system at a particular reality may be utilized as a reference for what delta in space the next displayable scene data may fall with respect to the origin of the displayable frame data for that particular reality. This may allow the system to virtually speed up the frame rate of mediated reality data provided to the user (e.g., via display output component 112) by moving the center of the displayable scene data ahead of the center of the displayable frame data in a particular direction when the instantaneous motion for the system at the particular reality is positive with respect to that particular direction, and may virtually slow down the frame rate of mediated reality data provided to the user by moving the center of the displayable scene data behind the center of the displayable frame data in a particular direction when the instantaneous motion for the system at the particular reality is negative with respect to that particular direction.

FIG. 6 is a flowchart of an illustrative process 600 for generating computer-mediated reality display data based on instantaneous motion data. At step 602, process 600 may include determining a current reality of a computer-mediated reality display system. For example, subsystem 201 (e.g., generator 202) may determine the current reality of system 100 (e.g., using frame definition data 213). At step 604, process 600 may include determining a current instantaneous motion of the computer-mediated reality display system. For example, subsystem 201 (e.g., generator 208) may determine the current instantaneous motion of system 100 (e.g., using scene definition data 217). At step 606, process 600 may include generating displayable mediated reality scene data based on the current reality and the current instantaneous motion. For example, subsystem 201 (e.g., generator 208) may generate displayable scene data 219, which may be based on the current reality of system 100 (e.g., frame definition data 213 and any accessible mediated reality data (e.g., mediated reality data 211)), and on the current instantaneous motion of system 100 (e.g., scene definition data 217). In some embodiments, process 600 may also include generating displayable mediated reality frame data (e.g., displayable frame data 215) based on the current reality. Moreover, process 600 may also include selecting a portion of the displayable mediated reality frame data as the displayable mediated reality scene data based on the instantaneous motion. In some embodiments, a center or other point of origin of the selected portion of the displayable mediated reality frame data may be offset from a center or other point of origin of the displayable mediated reality frame data based on the instantaneous motion.

It is to be understood that the steps shown in process 600 of FIG. 6 is merely illustrative and that existing steps may be modified or omitted, additional steps may be added, and the order of certain steps may be altered.

Moreover, one, some, or all of the processes described with respect to FIGS. 1-6, as well as any other aspects of the disclosure, may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and a data storage device (e.g., memory 104 of FIG. 1). In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from one electronic device to another electronic device using any suitable communications protocol (e.g., the computer-readable medium may be communicated to system 100 from a remote server via communications component 106 (e.g., as at least a portion of an application 103)). Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module of subsystem 201 (e.g., generator modules 202, 206, and/or 208) may be provided as a software construct, firmware construct, one or more hardware components, or a combination thereof. For example, subsystem 201 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules of subsystem 201 are merely illustrative, and that the number, configuration, functionality, and interconnection of existing modules may be modified or omitted, additional modules may be added, and the interconnection of certain modules may be altered.

At least a portion of one or more of the modules of subsystem 201 may be stored in or otherwise accessible to system 100 in any suitable manner (e.g., in memory 104 of system 100). Any or each module of subsystem 201 may be implemented using any suitable technologies (e.g., as one or more integrated circuit devices), and different modules may or may not be identical in structure, capabilities, and operation. Any or all of the modules of subsystem 201 may be mounted on an expansion card, mounted directly on a system motherboard, or integrated into a system chipset component (e.g., into a "north bridge" chip). Subsystem 201 may include any amount of dedicated media playback memory, may include no dedicated media playback memory and may rely on device memory or network memory (e.g., memory of a remote server), or may use any combination thereof.

Subsystem 201 may be a dedicated system that may be implemented using one or more expansion cards adapted for various bus standards. For example, all of the modules of subsystem 201 may be mounted on different interconnected expansion cards or all of the modules of a system may be mounted on one expansion card. The modules of subsystem 201 may interface with a motherboard or processor 102 of system 100 through an expansion slot (e.g., a peripheral component interconnect ("PCI") slot or a PCI express slot). Alternatively, subsystem 201 need not be removable but may include one or more dedicated modules that may include memory (e.g., RAM) dedicated to the utilization of the module. In other embodiments, subsystem 201 may be a system integrated into system 100. For example, a module of subsystem 201 may utilize a portion of device memory 104 of system 100. One or more of the modules of subsystem 201 may include its own processing circuitry and/or memory. Alternatively each module of subsystem 201 may share processing circuitry and/or memory with any other module of subsystem 201 and/or processor 102 and/or memory 104 of system 100.

While there have been described systems, methods, and computer-readable media for generating computer-mediated reality display data based on user instantaneous motion data, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. Non-transitory computer-readable medium having computer-readable instructions recorded thereon for processing mediated reality scene data, comprising, at least one sensor, a mediated reality data source, and a mediated reality display generator that generates displayable mediated reality scene data based on (a) current reality data of a system from the at least one sensor; (b) mediated reality data from the mediated reality data source; and (c) instantaneous motion data of the system from the at least one sensor;

wherein the mediated reality display generator generates the displayable mediated reality scene data by executing, program instructions for generating displayable mediated reality frame data based on the current reality data and the mediated reality data; and program instructions for selecting a portion of the displayable mediated reality frame data as the displayable mediated reality scene data based on the instantaneous motion data, wherein the portion that is selected is offset from a center of the displayable mediated reality frame data and is less than a frame size of the displayable mediated reality frame data, the offset is selected based on said instantaneous motion.

2. The non-transitory computer-readable medium of claim 1, wherein:

the current reality data of the system is provided to the mediated reality display generator from a first sensor of the at least one sensor; and the instantaneous motion data of the system is provided to the mediated reality display generator from a second sensor of the at least one sensor.

3. The non-transitory computer-readable medium of claim 1, wherein the current reality data of the system is indicative of a current location of the system.

4. The non-transitory computer-readable medium of claim 3, wherein:

the current reality data of the system is provided to the mediated reality display generator from a first sensor of the at least one sensor;

the first sensor comprises a global positioning system sensor.

5. The non-transitory computer-readable medium of claim 3, wherein the mediated reality data of the system is indicative of information that is both related to the current location of the system and useful to a user of the system.

6. The non-transitory computer-readable medium of claim 1, wherein the current reality data of the system is indicative of a current orientation of the system.

7. The non-transitory computer-readable medium of claim 6, wherein:

the current reality data of the system is provided to the mediated reality display generator from a first sensor of the at least one sensor;

the first sensor comprises at least one of a compass sensor and a gyroscope sensor.

8. The non-transitory computer-readable medium of claim 1, wherein:
the instantaneous motion data of the system is provided to the mediated reality display generator from a first sensor of the at least one sensor;
the first sensor comprises at least one accelerometer sensor.

* * * * *